United States Patent Office 2,712,364
Patented July 5, 1955

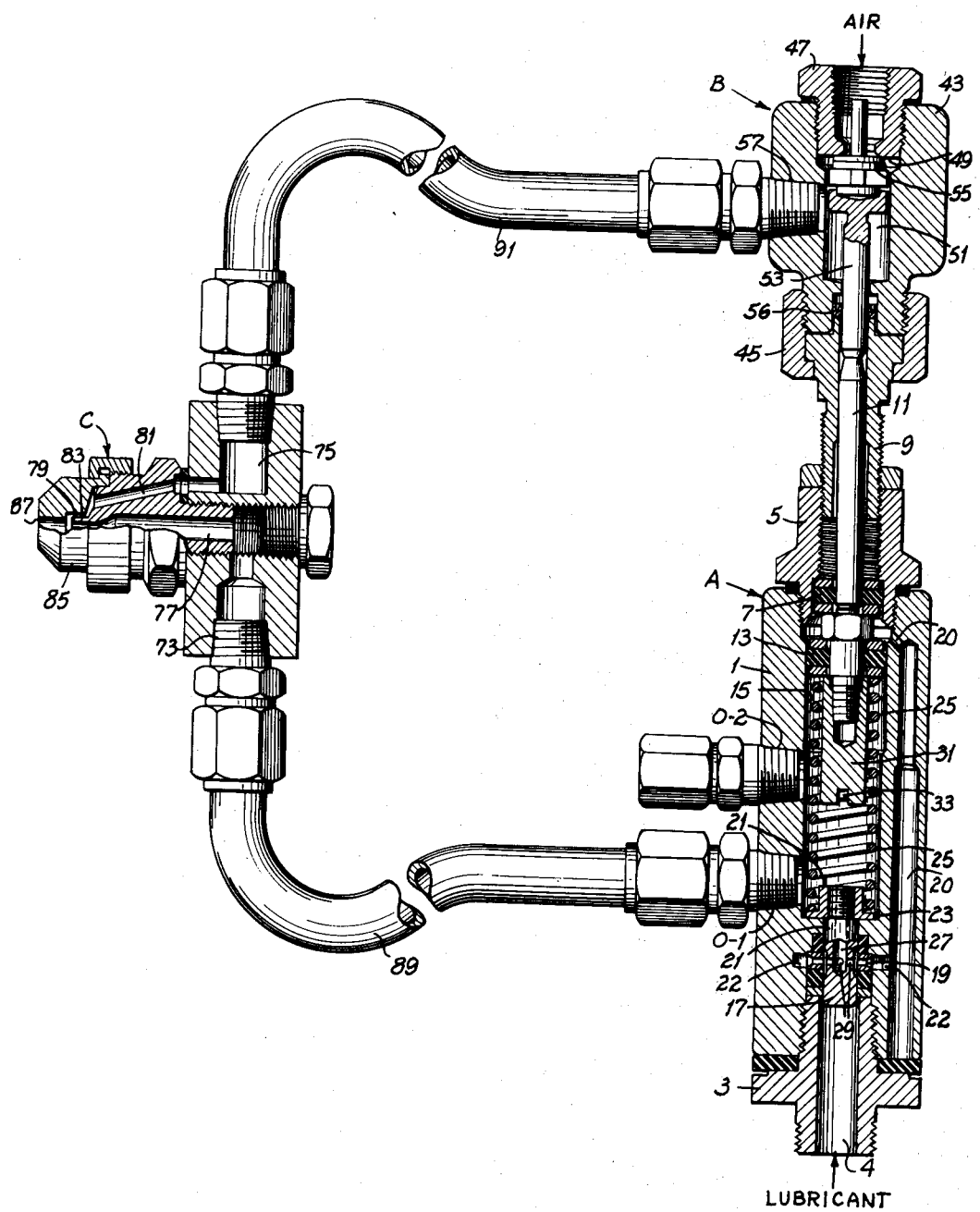

2,712,364

LUBRICATING APPARATUS

Albert T. Laspe, Normandy, Mo., assignor to Lincoln Engineering Company, St. Louis, Mo., a corporation of Missouri Application March 12, 1954, Serial No. 415,727

2 Claims. (Cl. 184—56)

This invention relates to lubricating apparatus, and more particularly to lubricant spraying apparatus.

Among the several objects of the invention may be noted the provision of a lubricant spraying apparatus for atomizing a measured amount of lubricant (oil) and spraying it on parts to be lubricated, such as open gear faces, the apparatus being particularly useful in a centralized lubrication system of a known type having a plurality of lubricant injectors for injecting lubricant into bearings, where the same lubricant as used for the bearings is satisfactory for lubricating the open gear faces; the provision of a lubricant spraying apparatus of this class which applies a measured charge of lubricant to the open gear faces in a fine mist to obtain substantially uniform surface coverage, rather than having an excess of lubricant in one spot and none elsewhere, and without waste of lubricant; and the provision of apparatus of this class which is reliable in operation. Other objects and features will be in part apparent and in part pointed out hereinafter.

The invention accordingly comprises the constructions hereinafter described, the scope of the invention being indicated in the following claims.

In the accompanying drawing, in which one of various possible embodiments of the invention is illustrated, the single figure is a section showing a spraying apparatus constructed in accordance with this invention.

Referring to the drawing, a lubricant spraying apparatus of this invention is shown to comprise a lubricant injector, generally designated A, which is adapted to be connected to a lubricant delivery line (not shown) in a central lubrication system which periodically delivers lubricant under pressure to a plurality of injectors (not shown) including the injector A. The system may be, for example, of the character shown in U. S. Patent 2,141,022, dated December 20, 1938, and U. S. Patent 2,206,335, dated July 2, 1940. The injector A is illustrated as being of the type shown in U. S. Patent 2,358,719, dated September 19, 1944. While reference may be made to this patent for complete details as to the injector A, to facilitate an understanding of this invention the following brief description of the essential features of the injector is included:

Injector A is shown to comprise a hollow injector body 1 in one end of which is screwed an inlet bushing 3 adapted for connection to the lubricant delivery line of a central lubrication system having an inlet opening 4 for receiving lubricant under pressure from the line. Screwed in the other end of the body is a nipple 5 which contains a packing member 7 and a guide bushing 9 for a pin 11. This pin 11 is attached to a piston 13 which slides in a measuring chamber 15 in the body 1. The chamber 15 is shown as having two outlets O–1 and O–2. A slide valve 17 operates across valve ports 19. It has a hollow extension 21 which reaches into the measuring chamber 15, where it is provided with a spring seat 23 for a spring 25 reacting from the piston 13. The hollow portion of the extension 21 is indicated as a bore 27, from which extend radial passages or ports 29. The valve has a streamlined or hourglass waist at the belt surrounding the ports 29. A bypass 20 including an annulus 22 reaches from ports 19 to the space in chamber 15 behind (above) the piston 13. An extending abutment 31 from the piston 13 having a cross passage 33 in its end is engageable with the upper end of the extension 21.

During intervals between the periodic delivery of lubricant under pressure to the injector A via the delivery line (not shown) and inlet 4, the piston 13 occupies the raised position shown in the drawing at the upper end of the measuring chamber 15. The measuring chamber is filled with lubricant introduced during the previous cycle of the injector. This lubricant is not under pressure. Upon increase of pressure in the inlet 4, as occurs upon increase of pressure in the delivery line, the slide valve 17 is raised from the position shown in the drawing against the bias of spring 25, and its lower end crosses the ports 19. Lubricant then flows through the bypass 20 behind (above) the piston 13 and drives it downward to force lubricant from the measuring chamber 15 through (as herein shown) outlet O–1. Spring 25 is compressed until member 31 engages the end of extension 21. The area of piston 13 is greater than the area of the end of valve 17, and hence the valve is pushed down by the pressure which actuates the piston. When the valve, in moving downward, blocks off ports 19, no pressure is available to move the piston farther. The piston and valve remain in the resulting position until pressure in inlet 4 is relieved by relieving pressure in the delivery line in known manner, such as shown for example in U. S. Patents 2,141,022 and 2,206,335. Then the spring 25 pushes the valve 17 down to its Fig. 1 position. This places ports 29 in communication with ports 19, and lubricant is forced from above the piston 13 through bypass 20, ports 19, ports 29 and bore 27 to the measuring chamber below the piston, thus recharging the injector.

Bushing 9 extends upward from the injector 1 and carries an air valve generally designated B. As shown, this valve comprises a valve body 43 held on the upper end of the bushing by a coupling nut 45. An inlet fitting 47 is threaded in the upper end of the valve body providing a downwardly facing valve seat 49 at the upper end of chamber 51 in the body. A valve stem 53 is vertically slidable in the body 43 and carries on its upper end a valve member 55 for engagement with the seat 49. The stem 53 extends out of the lower end of the body into the bushing 9 for engagement of its lower end by the pin 11. Packing for stem 53 is shown at 56. Valve B has a lateral outlet 57 from chamber 51. When the piston 13 of the injector is raised, pin 11 is raised to hold up the valve stem 53 and hold valve member 55 closed against the valve seat 49 against air pressure in the inlet. When the piston 13 moves downward to deliver lubricant from measuring chamber 15, pin 11 moves downward and stem 53 and valve member 55 are thereby released to allow member 55 to open under air pressure in the inlet for flow past member 55 to the outlet 57.

At C is shown an atomizer having an inlet 73 for lubricant, an inlet 75 for air, a central lubricant passage 77 from the lubricant inlet to a nozzle 79, and a passage 81 for air to an annular space 83 around nozzle 79 provided by a head 85 having an outlet at 87. A lubricant line 89 connects outlet O–1 of the injector to the lubricant inlet 73 of the atomizer, and an air line 91 connects outlet 57 of the air valve B to the air inlet 75 of the atomizer. Outlet O–2 of the injector is not used and is plugged.

As will be clear from the above, piston 13 and pin 11 are raised during intervals between the periodic delivery of lubricant under pressure to the injector 1, and the pin holds air valve B closed. When pressure of lubricant inlet 4 increases, and the injector starts to discharge lubricant through outlet O–1 and line 89 to the atomizer, the air valve opens to deliver air through line 91 to the atomizer. The air atomizes the lubricant issuing through nozzle 79, and a fine mist of lubricant and air is discharged by the atomizer upon open gear faces or other parts to be lubricated. When pressure in inlet 4 is relieved, piston 13 and pin 11 rise, and the valve stem 53 is pushed upward to close the air valve and cut off flow of air to the atomizer.

In view of the above, it will be seen that the several objects of the invention are achieved and other advantageous results attained.

As various changes could be made in the above constructions without departing from the scope of the invention, it is intended that all matter contained in the above description or shown in the accompanying drawing shall be interpreted as illustrative and not in a limiting sense.

I claim:

1. Lubricant spraying apparatus comprising an injector having an inlet adapted for connection to a lubricant delivery line, a measuring chamber, and an outlet from the measuring chamber, a piston slidable in the measuring chamber, said piston having a retracted position wherein it is located adjacent one end of the injector and being movable from said retracted position toward the other end of the injector to deliver a measured charge of lubricant through the outlet upon increase of pressure in the inlet, the injector being adapted to recharge with lubricant upon relief of pressure in the inlet and the piston thereupon returning to retracted position, an atomizer having a lubricant inlet and an air inlet, an air valve mounted on said one end of the injector having an inlet and an outlet, a lubricant line connecting the injector outlet and the atomizer lubricant inlet, an air line connecting the valve outlet and the atomizer air inlet, and a pin extending from the piston through said one end of the injector into the valve, said pin controlling the valve to effect opening thereof for delivery of air to the atomizer whenever the piston operates to deliver a measured charge of lubricant to the atomizer, and holding the valve closed when the piston is in retracted position.

2. Lubricant spraying apparatus as set forth in claim 1 wherein the valve has a valve member movable against air pressure in the valve inlet against a seat, and wherein the valve member is held against the seat by the pin when the piston is in retracted position, the pin releasing the valve member to be moved away from the seat by air pressure in the valve inlet when the piston moves away from retracted position.

References Cited in the file of this patent

UNITED STATES PATENTS 2,667,236     Graves _____ Jan. 26, 1954